United States Patent
Jaeckel et al.

(10) Patent No.: US 6,613,444 B1
(45) Date of Patent: Sep. 2, 2003

(54) BACKING-LINED SANITARY ARTICLE AND PROCESS FOR THE PRODUCTION THEREOF

(75) Inventors: Rudiger Jaeckel, Langenselbold (DE); Hans Josef Ritzert, Langenselbold (DE); Axel Schroder, Hanau (DE); Ralf Debes, Krombach (DE); Peter Seelmann, Vienna (DE)

(73) Assignee: Roehm GmbH & Co., KG, Darmstadt (DE)

( * ) Notice: Subject to any disclaimer, the term of this patent is extended or adjusted under 35 U.S.C. 154(b) by 0 days.

(21) Appl. No.: 09/402,583

(22) PCT Filed: Apr. 1, 1998

(86) PCT No.: PCT/EP98/01881

§ 371 (c)(1),
(2), (4) Date: Jan. 14, 2000

(87) PCT Pub. No.: WO98/45375

PCT Pub. Date: Oct. 15, 1998

(30) Foreign Application Priority Data

Apr. 8, 1997 (DE) .......................... 197 14 399

(51) Int. Cl.$^7$ ................................. B32B 27/30
(52) U.S. Cl. ..................... 428/522; 428/34.1; 428/215; 428/327; 428/334; 428/515; 428/520
(58) Field of Search ................. 428/500, 515, 428/520, 522, 34.1, 212, 213, 215, 332, 334, 402, 323, 324, 327

(56) References Cited

U.S. PATENT DOCUMENTS

| 4,303,736 A | * | 12/1981 | Torbin | 428/403 |
| 4,843,104 A | * | 6/1989 | Melber et al. | 521/54 |
| 5,580,621 A | * | 12/1996 | Kuszaj et al. | 428/34.1 |

FOREIGN PATENT DOCUMENTS

| DE | 0 693 503 A1 | * | 7/1995 |
| EP | 0 753 402 A2 | | 1/1997 |

* cited by examiner

*Primary Examiner*—Paul Thibodeau
*Assistant Examiner*—Christopher Paulraj
(74) *Attorney, Agent, or Firm*—Oblon, Spivak, McClelland, Maier & Neustadt, P.C.

(57) ABSTRACT

Sanitary applicances with a casing, such as bath tubs, shower trays or washbasins, are glass fiber- and asbestos-free, and are further characterized in that the reinforcing material is 1.5 to 10 mm thick and consists of one or two layers. The one layer or the first layer of a multilayered reinforcement is obtained by hardening a first polylmerizable, cole-hardenable, reactive (meth)acrylate system sprayed on the back of the acrylic glass moulding. The (meth)acrylate system contains as filler hollow microparticles, preferably made of plastics, filled with an inert gas. The composition of the (meth)acrylate system is defined by the invention. The disclosed sanitary appliances meet all requirements of the DIN EN 19 norm and can be recycled.

13 Claims, No Drawings

BACKING-LINED SANITARY ARTICLE AND PROCESS FOR THE PRODUCTION THEREOF

The invention relates to backing-lined sanitary articles according to the precharacterizing clause of claim 1 and to a process for the production of such sanitary articles.

In particular, the invention relates to bathtubs or shower trays or sinks, which have a preferably thermoformed acrylic glass moulding reinforced on its reverse with 1.5 to 10 mm thick polymer material, which is glass fibre- and asbestos-free and is bonded firmly to the acrylic glass moulding without additional adhesion promoters, this reinforcement being obtainable by polymerization of a (meth)acrylate system.

The following publications are mentioned for the closer prior art:
  D1=Patent Abstracts of Japan, unexamined applications, section M, volume 17, no.694, Dec. 17, 1993, The Patent Office Japanese Government page 45 M 1531; & JP-A-05 237 854;
  D2=DE 36 44 111 A1;
  D3=FR 2 640 909;
  D4=EP-A-0 693 503;
  D5=EP-A-0 285 046;
  D6=EP-A-0 345 581;

Reinforced acrylic glass mouldings as baths or basins in the sanitary sector are known in principle. Thus, Japanese Laid-Open Specification JP-A 05-237854 of Mitsubishi Rayon (=D1) describes a production process in which a filler-containing containing resin mixture is introduced into a gap between the mould and thermoformed acrylic glass moulding and then cured integrally in contact with the moulding. A mixture of 90 parts by wt. of a prepolymer of a methacrylic ester and 10 parts by wt. of a methacrylate monomer with 60 wt. % aluminium hydroxide, for example, is used as the filler-containing resin mixture. This mixture is poured, together with-initiator and crosslinking agent, into a gap 8 mm thick between the preformed acrylic glass component and the mould. The mixture in the gap can then be cured for 4 h, the surface of the gap between the mould and the moulding being covered with a polyester film.

Fillers which are proposed for the resin mixture to be poured in are, in addition to aluminium hydroxide, furthermore calcium carbonate, glass fibres or carbon fibres.

Although laminated composite bodies, in particular bathtubs or shower trays or also sinks, which have entirely satisfactory properties in respect of the adhesion of the reinforcing layer to the thermoformed acrylic glass moulding of the base and in respect of the strength of the entire composite body are obtainable by the casting process proposed in the Japanese Laid-Open Specification D1 referred to, both the moulding and the process for its production have particular disadvantages in at least two respects.

On the one hand, for production of the backing-lined moulding, a second mould in which the volume required for casting the reinforcing composition must also be taken into account is always necessary.

On the other hand, only a relatively thick backing lining of the thermoformed moulding (8 mm in the abovementioned example) is possible, since relatively large differences in thickness can easily occur in a casting process, and these can no longer be tolerated at backing lining thicknesses which are too low, such as would be entirely desirable on the basis of consumption of material and saving weight.

D2 (=DE 36 44 111 A1) discloses a process for the production of a bathtub reinforced with plastic, in which a tub which has been produced from acrylic glass by the thermoforming process is reinforced with a glass fibre-reinforced polyester resin layer sprayed onto the outside. However, both the fibre reinforcement and the backing lining with polyester material are unsuitable for simple and substantially complete recyclability of used mouldings, and indeed render this almost impossible.

FR 2 640 909 (=D3) relates to a sandwich structural component for the sanitary sector of thermoplastic resin (e.g. PMMA), and a glass fibre mat preformed on the structural component mould of the thermoplastic resin component. These components are bonded in a mould by injecting in a syrupy polyester formulation between the preformed acrylic and fibre components. The possibility of using an acrylic resin is also mentioned. As in D2, the use of glass fibres, whether in the form of mat or of a chopped roving, is to be regarded as prohibitive for reprocessing of used mouldings. Furthermore, the process suggested by D3 is under no circumstances a spray process, but rather an injection (squirting) process, which requires just as much outlay and is just as disadvantageous as the casting process of D1. Several working steps, several people, several moulds and reworking steps are required to arrive at a product.

Reinforced sanitary articles which have a thermoformed acrylic glass moulding reinforced on its reverse with a layer of a fibre-containing polymer material which is bonded firmly to the acrylic glass moulding without additional adhesion promoters are also known from EP-A-0 693 503 (=D4).

These backing-lined sanitary articles are characterized in that the reinforcing layer is 1 to 5 mm thick and is obtainable by curing a polymerizable, cold-curing, reactive (meth) acrylate system sprayed on to the reverse of the acrylic glass moulding. The (meth)acrylate system here comprises, as essential constituents, in addition to the polymerizable constituents, a redox system, fine fillers and, for reinforcement, 10–50 per cent by weight of chopped glass fibres.

One advantage of the known backing-lined sanitary article is said to be that its reprocessing by depolymerization—provided that the fine fillers are accordingly suitably chosen—is said to be possible without problems. Although this applies without limitation in respect of the fine fillers which can be seen from D4, the chopped glass fibres required in large quantities for the reinforcement are not unproblematic in the depolymerization, which unfortunately has been confirmed by extensive results from practice. Although it can be assumed in theory that the chopped fibres from used components collect on the surface of the metal bath required for the depolymerization and can be skimmed off with a slide bar or doctor blade, it has been found that the chopped fibres remain in the metal bath to a degree which cannot be ignored, and cannot be readily separated off. Furthermore, the chopped glass fibres in principle are to be evaluated in the same way as asbestos fibres in respect of work safety. A health hazard to the operating personnel due to the chopped glass fibres, which are partly obtained in the form of dust during the depolymerization, cannot readily be excluded. It would accordingly a priori be highly desirable to dispense with such fibre fillers.

In addition, the (meth)acrylate systems on which the reinforcing layers from the prior art are based tend at least in some cases towards disturbances in curing, for example air inclusions etc. The chopped glass fibres essential for the reinforcement protrude, which means that after spraying on, the fibres of some centimetres length do not lie flat on the reverse of the moulding, but during development of the tangle within the reinforcing material the fibres can project from the plane of the moulding to a greater or lesser degree. Rolling for compensating the disturbances in curing and pressing on the fibre reinforcements are therefore unavoidable. This manual reworking—that is to say reworking by hand—requires outlay and makes the product more expensive.

Although the impression could be gained that the production variant disclosed in D4 could also manage without glass fibre-reinforcement, D4 documents the need for glass fibre reinforcements through all the examples. In addition, component G) according to D4 is designated an essential constituent of the reinforcing layer. However, an essential constituent cannot be simply omitted without raising doubts as to the success of the technical doctrine. This is a clear indication that the technical doctrine of D4 includes no reinforcing layers which are free from glass fibres and therefore discloses and renders accessible no corresponding solution to the expert. There is therefore still the unsolved problem of backing-lined sanitary articles which are completely recyclable and are free from chopped glass fibres and polyester resin, and as a result of course an increased demand for such articles.

D5 and D6 merely disclose the technological background in respect of the subject of the present Application.

In view of the prior art mentioned herein and discussed in detail, an object of the invention was to provide reinforced sanitary articles which are free from chopped glass fibres and free from asbestos.

The provision of completely recyclable sanitary articles which are based on acrylic glass mouldings has furthermore been the object of the invention.

Another object of the invention is to provide completely recyclable backing-lined acrylic glass mouldings which are completely recyclable as far as possible without a hazard to the operating personnel, in particular using the depolymerization technique by means of metal baths which is known for acrylic glass.

Another object of the invention is to provide backing-lined sanitary articles which, with the maximum possible saving of material, meet the general requirements imposed on sanitary articles in respect of stability.

It was also an object of the invention here, inter alia, to provide sanitary articles with an adequate durability of the reinforcing layer also, and in particular, without an additional adhesion promoter.

The formation of cracks in the reinforcing layer should also be suppressed as far as possible.

Yet another object is to provide, for acrylic glass mouldings, coatings which have the highest possible impact strength.

In particular, the provision of acrylic glass mouldings with the thinnest possible coating and a coating of highest possible impact strength is an object on which the invention is based.

Furthermore, the new sanitary articles should be as simple as possible to produce.

Reworking by hand should furthermore be reduced to a minimum.

A process for the production of backing-lined acrylic glass mouldings which is as non-hazardous as possible is furthermore to be provided.

Finally, the capability of the highest and simplest possible automation of the process for the production of backing-lined acrylic glass mouldings also plays a not insignificant role.

These objects and further objects which, although not mentioned individually word-for-word, can be readily inferred from the introductory discussion of the prior art or can be deduced as a matter of course, are achieved by a backing-lined sanitary article having all the features of claim 1.

The claims referring to the independent product claim provide advantageous embodiments of the sanitary article according to the invention.

From the process respect, the features of claim 8 provide a solution to the problem on which the invention is based in respect of the process aspects. Advantageous process variants are protected in the process claims dependent on the independent process claim.

In particular, by the fact that, in a backing-lined sanitary article comprising an acrylic glass moulding which is reinforced on its reverse with 1.5 to 10 mm thick polymer material which is free from glass fibres and asbestos and is firmly bonded to the acrylic glass moulding without additional adhesion promoters, the reinforcing material or reinforcement material is obtainable by curing a polymerizable, cold-curing, reactive (meth)acrylate system which is sprayed on to the reverse of the acrylic glass moulding and which comprises

| A) | a) (meth)acrylate | 30–100 wt. % |
| | a1) methyl (meth)acrylate | 0–100 wt. % |
| | a2) $C_2$–$C_4$ (meth)acrylate | 0–100 wt. % |
| | a3) $\geq C_5$ (meth)acrylate | 0–50 wt. % |
| | a4) polyfunctional (meth)acrylates | 0–50 wt. % |
| | b) comonomers | 0–50 wt. % |
| | b1) vinylaromatics | 0–30 wt. % |
| | b2) vinyl esters | 0–30 wt. % |

B) per 1 part by wt. of A), 0.05–5 parts by wt. of a (pre)polymer which is soluble or swellable in A)

C) a redox system which is to be kept completely or partly separate from the constituents of the system which are to be polymerized until the polymerization and comprises an accelerator and a peroxidic catalyst or initiator in an amount sufficient for cold-curing of component A)

D) customary additives

| E) fillers which are inert under the conditions of depolymerization, based on the sum of A)–E), with a fineness $\leq 100$ μm | 0–75 wt. % |
| F) hollow microparticles, preferably of plastic, filled with inert gas, based on the sum of A)–F) | 0.1–50 wt. %, | it is possible to meet all the requirements imposed by the standard institutes and industrial processors in respect of the physical properties of the sanitary article in an outstanding manner and to achieve a large number of further additional advantages.

These include, inter alia:

Complete recyclability by the route of depolymerization known per se, inter alia avoiding polyesters (absence of polyester resin) coupled with avoiding dusts which are unacceptable to health (absence of chopped glass fibres).

Omission of the "rolling step" in the production and as a result more extensive automation of the production process by spray robots.

Mechanical properties according to DIN EN 198 (deformability, impact strength, rigidity) are adhered to in an outstanding manner and met beyond the extent required.

High strength of the mouldings under stress and outstanding durability of the bond between the backing-lining layer and acrylic glass moulding.

In contrast to JP-A 05-237854, the process according to the invention is not an injection process in which the filler-containing resin mixture is introduced into a gap between the thermoformed acrylic glass moulding and a mould, but a spray process which requires no mould. A decisive advantage of the spray process here is the fact that for different tub designs, no correspondingly shaped, expensive moulds are required.

In JP-A 05-237854, the curing time of the mixture in the gap between the acrylic glass moulding and mould is stated as 4 hours. In contrast, the spray system according to the invention cures after 15–25 minutes at a hardener dosage of 5%. This means a substantial shortening of the production time.

Due to the preferred absence of solvent from the (meth) acrylate system, the risk of the occurrence of stress cracking is minimized. Solvent-containing systems in particular tend towards stress cracking in the finished reinforcing layer in the alternating temperature test according to DIN EN 198.

Compared with EP-A-0 693 503, there is not only the advantage of absence of chopped glass fibres or also glass fibre reinforcement generally, which is essential for complete recyclability, it has been found, in particular, that mechanical deficits still arise in sanitary articles according to EP-A-0 693 503, which raise doubts as to the suitability of the articles from EP-A-0 693 503. Thus, by using certain fillers F) in the reinforcing layer, it is possible to greatly improve precisely the mechanical and physical properties of a sanitary article according to the invention.

A backing-lined sanitary article of the invention comprises an acrylic glass moulding and at least one reinforcing backing-lining layer.

The Acrylic Glass Moulding

The shape and nature of the acrylic glass moulding which is backing-lined according to the invention are initially not subject to any particular limitation. Mouldings of acrylic glass which have been produced by all the processes known to the person skilled in the art for shaping acrylic glass can be backing-lined. These include, inter alia, processing via the viscous state, such as casting, pressing and application processes, preferably rotational casting, laminate moulding, compression moulding, transfer moulding, painting, dipping, coating, knife-coating, laminating and the like; processing via the elastoviscous state, such as kneading, milling, calendering, extruding, injection moulding, preferably sandwich injection moulding and RIM processes; processing via the elastoplastic state, such as drawing, stretch moulding, blow moulding, foaming, preferably cold-forming processes, such as stretch moulding, stretching, draw moulding, thermoforming, vacuum moulding, pultrusion, extrusion blow moulding, injection blow moulding, injection moulding blow moulding and injection blow shaping; processing via the viscoelastic state, such as welding, sintering, whirl sintering, flame spraying, hot jet spraying and the like; and processing via the solid state, such as cutting, stamping, forging, sawing, drilling, turning or milling. Thermoforming in all its variations, vacuum forming, vacuum forming without form limitation, vacuum negative processes, drop-forming processes, vacuum stretch-forming processes, thermoforming suction processes and the like, are preferred. Acrylic glass mouldings obtainable by thermoforming are particularly preferred for the invention.

There is likewise no limitation in respect of the nature of the acrylic glass. All the acrylic glasses available on the market can be used.

The acrylic glass mouldings which are provided, according to the invention, with a backing-lining layer comprise in respect of the acrylic glass moulding, in addition to customary additives, chiefly structural units which obey the following formula I in respect of their chemical structure:

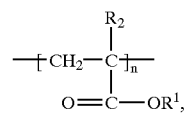

wherein $R^1$ is $C_{1-6}$-alkyl, preferably $C_{1-4}$-alkyl, $R^2$ is H, $C_{1-6}$-alkyl, preferably H or $C_{1-4}$-alkyl, very particularly preferably H or $CH_3$, and n is a positive integer greater than 1.

$C_{1-4}$-alkyl includes linear and branched alkyl radicals having one to four carbon atoms. Methyl, ethyl, n-propyl, iso-propyl, n-butyl, 2-methyl-1-propyl, sec.-butyl and 2-methyl-2-propyl are of interest in particular.

$C_{1-6}$-alkyl includes the radicals mentioned for $C_{1-4}$-alkyl and additionally radicals having 5 or 6 carbon atoms, such as, preferably, 1-pentyl, 2-pentyl, 3-pentyl, 2,2-dimethyl-1-propyl, 3-methyl-1-butyl, 3-methyl-2-butyl, 2-methyl-2-butyl, 2-methyl-1-butyl and 1-hexyl.

Examples of compounds which contain the abovementioned structural unit include, in addition to others, polymethyl acrylate, polyethyl acrylate, polymethyl methacrylate, polypropyl acrylate, polybutyl acrylate, polypropyl methacrylate, polybutyl methacrylate and copolymers which comprise two or more of these types of polymers. The first four compounds are preferred in the context of the invention. Polymethyl methacrylate (PMMA) is very particularly preferred.

In addition to the chemical mixtures (random copolymers or also block copolymers) which are formed by copolymerization of at least two substituted or unsubstituted acrylic acid ester monomers (e.g. methyl methacrylate/n-butyl methacrylate copolymers), acrylic glass mouldings from copolymers which comprise up to 50 wt. % of at least one other vinylically unsaturated monomer which can be copolymerized with at least one substituted or unsubstituted acrylic acid ester monomer can also be used in the context of the invention.

Examples of these are, inter alia, methyl methacrylate/styrene copolymers or methyl methacrylate/butyl acrylate/styrene terpolymers.

The comonomers are optional constituents or components which the acrylic glass preferably comprises in a minor amount in the form of copolymers containing them. As a rule, they are chosen such that they have no adverse effect on the properties of the acrylic glass to be used according to the invention.

The comonomer or comonomers mentioned can be employed, inter alia, to modify the properties of the copolymers in a desired manner, for example by increasing or improving the flow properties if the copolymer is heated to the melting point in the context of its processing to glass, or for reducing a residual colour in the copolymer or, by using a polyfunctional monomer, to introduce a certain degree of crosslinking into the copolymer in this manner.

Monomers which are suitable for this purpose include, inter alia, vinyl esters, vinyl chloride, vinylidene chloride, styrene, α-methylstyrene and the various halogen-substituted styrenes, vinyl and isopropenyl ether and dienes, such as, for example, 1,3-butadiene and divinylbenzene. The reduction in the colour of the copolymer can particularly preferably be achieved, for example, by using an electron-rich monomer, such as, for example, a vinyl ether, vinyl acetate, styrene or α-methylstyrene.

Aromatic vinyl monomers, such as, for example, styrene or α-methylstyrene, are particularly preferred among the comonomer compounds mentioned.

Physical mixtures, so-called blends, are also preferred for the acrylic glass mouldings.

It is also to be taken into account here, inter alia, that the term "acrylic glass" indeed in principle is a collective name for organic synthetic glasses of polymethacrylates, these being produced in the form of slabs, pipes, bars or blocks by bulk or bead polymerization (suspension polymerization) and subsequent extrusion or injection moulding.

In the context of the invention, however, by definition all the modifications described herein above are also to be understood under the term "acrylic glass".

However, synthetic glasses of polymethacrylic acid methyl esters are also particularly preferred for the invention.

The Backing-lining Layer(s)

In the sanitary articles according to the invention, e.g. tubs and sinks, by the fact that the reinforcing material can have a relatively small thickness in the range from 1.5 to 10 mm, preferably 1.5–<8 mm, it is possible to realize a high saving in weight and material, which is accompanied by a reduction in piece costs while the strength values required are adhered to. This savings effect is additionally increased by the nature of the reinforcing layer, in particular also in respect of the fillers F), and the method of application of the materials resulting in the reinforcing layer. An additional savings effect results from the fast curing time.

By using hollow microparticles of plastic filled with inert gas in the backing-lining layer or layers, it is possible to achieve, in a manner which is not readily foreseeable, a surprising improvement in important properties of the reinforced sanitary articles according to the invention.

The hollow beads which can be employed according to the invention thus have a relatively low density, compared with other very fine fillers, as a result of which the density of the sprayable material is reduced. This has the effect of a saving in material of approx. ⅓ for a similar layer thickness.

Furthermore, the mechanical properties of the cured material are improved considerably. Not only the fact that properties such as the impact strength or adhesive strength of the composite of acrylic glass moulding and backing lining are improved at all is surprising here, the quality of the improvement is even much more surprising. Thus, improvements in adhesive strength of 100% and more are to be recorded, compared with reinforcing layers without hollow microbeads.

Finally, the sedimentation properties of the fillers in the cold-curing (meth)acrylate resins are found to be improved dramatically. While with conventional resins demixing problems already have to be combated after a storage time of a few weeks or even days, the (meth)acrylate resins with fillers of category F) are still absolutely homogeneous and show no sediment at all even after several weeks, which significantly facilitates their processability by the user.

In a very particular embodiment, a sanitary article according to the invention is characterized in that the reinforcing material comprises a first and a second layer, the first layer being obtainable by curing a polymerizable, cold-curing, reactive, first (meth)acrylate system which is sprayed onto the reverse of the acrylic glass moulding and which comprises

| A) | a) (meth)acrylate | 30–100 wt. % |
|---|---|---|
| | a1) methyl (meth)acrylate | 0–100 wt. % |
| | a2) $C_2$–$C_4$ (meth)acrylate | 0–100 wt. % |
| | a3) $\geq C_5$ (meth)acrylate | 10–50 wt. % |
| | a4) polyfunctional (meth)acrylates | 0–50 wt. % |
| | b) comonomers | 0–50 wt. % |
| | b1) vinylaromatics | 0–30 wt. % |
| | b2) vinyl esters | 0–30 wt. % |

B) per 1 part by wt. of A), 0.05–5 parts by wt. of a (pre)polymer which is soluble or swellable in A)

C) a redox system which is to be kept completely or partly separate from the constituents of the system which are to be polymerized until the polymerization and comprises an accelerator and a peroxidic catalyst or initiator in an amount sufficient for cold-curing of component A)

D) customary additives

E) very fine fillers which are inert under the conditions of depolymerization, based on the sum of A)–E), with a fineness $\leq 100$ μm 0–75 wt. %

F) hollow microparticles, preferably of plastic, filled 0.1–50 wt. %, with inert gas, based on the sum of A)–F)

and the second layer being obtainable by curing a polymerizable, cold-curing, reactive, second (meth)acrylate system which is sprayed onto the first layer and differs from the first (meth)acrylate system, the same general definition applying to the second (meth)acrylate system as to the first (meth)acrylate system, apart from component a3), i.e. apart from the content of $\geq C_5$ (meth)acrylate, which is 0 to <10 wt. %, and apart from component F), which is present in an amount of 0–50 wt. %, based on the sum of A)–F).

Although all the requirements of DIN EN 198 can already be met with a single-layered reinforcement on the basis of the particular fillers, the two-layered reinforcement has the advantage, in the context of the invention, that certain mechanical properties (above all the impact strength) of the finished sanitary article can be improved further.

The backing-lining or reinforcing layer, like the minimum of two backing-lining layers which reinforce the acrylic glass moulding in an expedient modification of the invention, are obtainable by curing one or by curing two or more polymerizable, cold-curing, reactive (meth)acrylate systems, each of which are composed of components A) to D), which together represent the binder, as well as the fillers E) and F).

This means in a first variant that one (meth)acrylate system forms the sole reinforcing layer on the reverse of a sanitary article of moulded acrylic glass.

This also means that in a second variant a first (meth)acrylate system forms a first layer on the reverse of the acrylic glass moulding, while a second (meth)acrylate system forms a second layer on the reverse of the acrylic glass moulding and the first layer on the reverse.

Although in the latter case both, that is to say both the first and the second (meth)acrylate system can comprise components A) to F), the individual constituents are chosen in respect of nature and/or amount from the definitions stated such that the first and second (meth)acrylate system differ clearly from one another.

The Binder

The binder of a (meth)acrylate system is in turn composed of polymerizable monomers A), optionally (pre)polymers B) which are soluble or swellable in this, a redox system C) and, optionally, further customary additives D).

Component A

Component A) is an essential constituent of the binder and therefore of the reinforcing layer.

First Variant: Only One Reinforcing Layer

A single monomer, e.g. methyl methacrylate, can be employed as monomer A), but a mixture is usually used. The composition of component A) is:

| (meth)acrylate | 30–100 wt. % |
| --- | --- |
| methyl (meth)acrylate | 0–100 wt. % |
| $C_2$–$C_4$ (meth)acrylate | 0–100 wt. % |
| $\geq C_5$ (meth)acrylate | 0–50 wt. % |
| polyfunctional (meth)acrylates | 0–50 wt. % |
| comonomers | 0–50 wt. % |
| vinylaromatics | 0–30 wt. % |
| vinyl esters | 0–30 wt. % |

Styrene is preferably limited to max. 20 wt. % in A), since a higher content leads to disturbances in the cold-curing and severe odour nuisances are to be expected.

A constituent in parentheses represents optional use thereof, i.e. (meth)acrylate represents acrylate and/or methacrylate.

Monomer component A) comprises at least 30 wt. % (meth)acrylate, monofunctional (meth)acrylates with a $C_1$–$C_4$-ester radical being preferred. Longer-chain esters, i.e. those with a $C_5$- or longer-chain ester radical, are limited to 50 wt. % in component A).

The long-chain (meth)acrylates in the amount stated make the system more impact-resistant. These esters therefore indeed make the backing lining of the acrylic glass mouldings more flexible, but also softer, as a result of which the use properties would be limited with amounts above 50 wt.%. Component A) preferably also comprises polyfunctional (meth)acrylates. In the first case, the $\geq C_5$ (meth)acrylates are preferably contained in the (meth)acrylate system in component A) in an amount of 10–30 wt. %, particularly expediently in an amount of 15–25 wt. %.

In addition to the (meth)acrylates, component A) can also comprise other comonomers, the proportion thereof being limited to 50 wt. %. Among these comonomers, component A) can comprise vinylaromatics and/or vinyl esters to the extent in each case of up to 30 wt. %. Higher proportions of vinylaromatics are difficult to polymerize in and can lead to a demixing of the system. Higher proportions of vinyl esters can furthermore cure completely only inadequately at low temperatures and tend towards greater shrinkage properties.

Component A) is preferably built up to the extent of 80–100 wt. %, and particularly preferably to the extent of 90–100 wt. %, from (meth)acrylates, since favourable processing and use properties for the backing lining can be achieved with these monomers. The proportion of $C_2$–$C_4$-esters in (meth)acrylates is preferably limited to 50 wt. % in component A), and component A) preferably comprises these esters to the extent of max. 30 wt. %, and particularly advantageously to the extent of max. 20 wt. %. Particularly flexible backing-lining layers can be built up by this means.

Suitable monofunctional (meth)acrylates are, in particular, methyl methacrylate, butyl methacrylate, butyl acrylate, 2-ethylhexyl acrylate, ethyl triglycol methacrylate and hydroxypropyl methacrylate.

Particularly suitable comonomers are vinyltoluene, styrene and vinyl esters.

Component A) particularly advantageously comprises polyfunctional (meth)acrylates, the content thereof in A) usually being in the range from 1 to 50 wt. %, and in most cases 1 to 10 wt. %. The polyfunctional (meth)acrylates are used for polymer linkage between linear molecules. Properties such as flexibility, scratch resistance, glass transition temperature, melting point or curing processes can be influenced as a result.

Polyfunctional (meth)acrylates which can be employed include, inter alia:

(i) Difunctional (meth)acrylates

Compounds of the general formula:

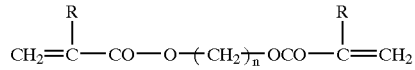

wherein R is hydrogen or methyl and n . . . [sic] a positive integer between 3 and 20, such as e.g. the di(meth)acrylate of propanediol, butanediol, hexanediol, octanediol, nonanediol, decanediol and eicosanediol, compounds of the general formula:

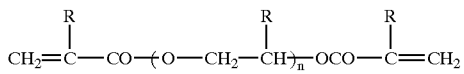

wherein R is hydrogen or methyl and n . . . [sic] a positive integer between 1 and 14, such as e.g. the di(meth)acrylate of ethylene glycol, diethylene glycol, triethylene glycol, tetraethylene glycol, dodecaethylene glycol, tetradecaethylene glycol, propylene glycol, dipropylene glycol and tetradecapropylene glycol; and glycerol di(meth)acrylate, 2,2'-bis[p-(γ-methacryloxy-β-hydroxypropoxy)-phenylpropane] or bis-GMA, bisphenol A dimethacrylate, neopentylglycol di(meth)acrylate, 2,2'-di(4-methacryloxypolyethoxyphenyl) propane having 2 to 10 ethoxy groups per molecule and 1,2-bis(3-methacryloxy-2-hydroxypropoxy)butane.

(ii) Tri- or polyfunctional (meth)acrylates

Trimethylolpropane tri(meth)acrylate and pentaerythritol tetra(meth)acrylate.

Preferred conventional polyfunctional (meth)acrylates include, in addition to others, triethylene glycol dimethacrylate (TEDMA), trimethylolpropane trimethacrylate (TRIM), 1,4-butanediol dimethacrylate (1,4-BDMA) and ethylene glycol dimethacrylate (EDMA).

Second Variant: at Least Two Reinforcing Layers a) first (meth)acrylate system, i.e. methacrylate system of the first reinforcing layer, i.e. that reinforcing layer which is sprayed directly on to the acrylic glass moulding and cured thereon.

The composition of component A) for this case is:

| (meth)acrylate | 30–100 wt. % |
| --- | --- |
| methyl (meth)acrylate | 0–100 wt. % |
| $C_2$–$C_4$ (meth)acrylate | 0–100 wt. % |
| $\geq C_5$ (meth)acrylate | 10–50 wt. % |
| polyfunctional (meth)acrylates | 0–50 wt. % |
| comonomers | 0–50 wt. % |
| vinylaromatics | 0–30 wt. % |
| vinyl esters | 0–30 wt. % |

Longer-chain (meth)acrylates, i.e. those with a $C_5$- or longer-chain ester radical, are an essential constituent in the (meth)acrylates of the first (meth)acrylate system, since they make up at least 10 wt. % of the (meth)acrylates and therefore also of component A) of the first (meth)acrylate system.

b) second (meth)acrylate system, i.e. (meth)acrylate system of the second reinforcing layer, i.e. that layer which is sprayed on to a first reinforcing layer already sprayed on to the reverse of the acrylic glass moulding and is cured on the first reinforcing layer.

The same general definition applies to the second (meth) acrylate system, in respect of the nature of the monomers (component A)), as for component A) of the first (meth) acrylate system, there being a substantial difference in the $\geq C_5$-methacrylates.

The composition of component A) is:

| | |
|---|---|
| (meth)acrylate | 30–100 wt. % |
| methyl (meth)acrylate | 0–100 wt. % |
| $C_2$–$C_4$ (meth)acrylate | 0–100 wt. % |
| $\geq C_5$ (meth)acrylate | 0–<10 wt. % |
| polyfunctional (meth)acrylates | 0–50 wt. % |
| comonomers | 0–50 wt. % |
| vinylaromatics | 0–30 wt. % |
| vinyl esters | 0–30 wt. % |

Longer-chain esters, i.e. those with a $C_5$- or longer-chain ester radical, are limited to <10 wt. % in component A). These esters indeed make the backing lining of the acrylic glass mouldings more flexible, but also softer, which means that their use properties are limited. As a result, the formulation of the second layer (small proportion of $\geq C_5$-esters) is harder and therefore more rigid compared with the first layer.

Component B)

The following description applies both to a single-layered reinforcement and to the first and also the second (meth) acrylate system of a multilayered reinforcement, and if several reinforcing layers are present the particular component B) in each of the systems obeys the following definition independently of one another.

Component B) is essential.

To establish the viscosity of the binder and the overall rheology of the system and the better complete curing, a polymer or prepolymer B) is added to component A). This (pre)polymer should be soluble or swellable in A). 0.05 to 5 parts of prepolymer B) are employed per one part of A). Poly(meth)acrylates are particularly suitable, it being possible for these to be dissolved as a solid polymer in A), or it being possible for a so-called syrup, i.e. partly polymerized compositions of corresponding monomers, to be employed. Polyvinyl chloride, polyvinyl acetate, polystyrene, epoxy resins, epoxy (meth)acrylates, unsaturated polyesters, polyurethanes or mixtures thereof are furthermore suitable. These polymers have the effect in the binder of e.g. specific flexibility properties or shrinkage regulation and act as a stabilizer, skin-forming agent or flow improver.

The backing-lining layers preferably comprise 10–30 wt. %, particularly advantageously 15–20 wt. %, of a high molecular weight polymer B), e.g. poly(meth)acrylate, based on the sum of A)+B).

In a preferred embodiment, the weight ratio of components B) and A) of the binder is in the range from 0.1:1 to 2:1. An optimum match is achieved by this means.

Weight ratios of B):A) in the range from 0.2:1 to 1:1 are particularly expedient.

Component B) ((pre)polymer) can be a suspension polymer, emulsion polymer and/or grinding granules from recycling processes. The average particle diameter of the prepolymers is then usually <0.8 mm.

Prepolymer B) is very advantageously a PMMA paint bead obtainable by suspension polymerization. This also allows, in particular, single-layered reinforcements of adequate impact strength.

The average particle diameter of the paint bead here is about 0.1–0.8 mm. 0.2–0.8 mm is preferred, in particular 0.4–0.8 mm.

The following description of component B) of the binder and therefore of a reinforcing layer applies in particular to the embodiment with at least two reinforcing layers.

(Pre)polymer B) is preferably a copolymer, it being possible for the hardness and flexibility of the reinforcing layers to be influenced by the nature and amount of the comonomer in (pre)polymer B). Comonomers which can be employed and which participate in the build-up of the particular (pre)polymer B) include, inter alia, acrylates and methacrylates other than methyl methacrylate (MMA), vinyl esters, vinyl chloride, vinylidene chloride, styrene, α-methylstyrene and the various halogen-substituted styrenes, vinyl and isopropenyl ether and dienes, such as, for example, 1,3-butadiene and divinylbenzene.

Preferred comonomers for methyl methacrylate are, inter alia. ethyl acrylate, butyl acrylate, 2-ethylhexyl acrylate, ethyl methacrylate, n-butyl methacrylate, 1-butyl methacrylate, 2-ethylhexy methacrylate, propyl acrylate, propyl methacrylate, methacrylic acid, ethyl triglycol methacrylate and hydroxypropyl methacrylate.

The comonomer content of prepolymers B) for the first reinforcing layer is favourably 30–80%, and for the second reinforcing layer is favourably 0–<30%, in each case based on the total weight of the monomers or monomer units participating in the build-up of a prepolymer B).

Component C)

Component C) is an essential component of the binder and therefore of each reinforcing layer.

The following description applies both to a single-layered reinforcement and to the first and also the second (meth) acrylate system of a multilayered reinforcement, component C) in each of the systems obeying the definition independently of one another.

The binder (A) to D)) to be used according to the invention in the (meth)acrylate system is in each case suitable for cold-curing, i.e. comprises, for the polymerization, a redox system of an accelerator and a peroxidic catalyst or initiator, these components being added in a sufficient amount for cold-curing of component A).

It goes without saying that either the redox system or at least components thereof are to be kept separate from the polymerizable substances of the binder until the desired time of the polymerization.

The accelerator is usually employed in A) to D) in an amount of 0.01 to 5 wt. %, particularly advantageously to the extent of 0.5 to 1.5 wt. %.

Particularly suitable accelerators are amines and mercaptans, and dimethyl-p-toluidine, diisopropoxy-p-toluidine, diethylol-p-toluidine [sic], dimethylaniline and glycol dimercaptoacetate are preferred. Organic metal salts furthermore serve as accelerators, and are usually employed in A) to D) in the range from 0.001 to 2 wt. %. Suitable salts are e.g. cobalt naphthenate, copper naphthenate, cobalt oleate and copper oleate.

Dibenzoyl peroxide and dilauroyl peroxide are particularly suitable as the peroxidic catalyst. The peroxides are usually employed in the binder to the extent of 0.1 to 10 wt. %, and in particular to the extent of 0.5 to 5 wt. %. An aqueous 40% suspension of stabilized dibenzoyl peroxide (e.g. Cadox 40 E from Akzo) is expediently employed as the peroxidic catalyst for the spray resin system.

The binder can already comprise the accelerator, e.g. dimethylparatoluidine, of component C), without polymerization taking place at ambient temperature. The reaction is started by addition of the remaining constituents of component C), the amount of component C) usually being chosen such that the (meth)acrylate system has a pot life in the range from 10 min to 30 min.

The (meth)acrylate system according to the invention thus comprises the complete component C) only immediately before use, and until use it comprises none or only part of component C).

Solvent-free hardener components are very particularly preferably employed.

Component D)

The following description applies both to a single-layered reinforcement and to the first and also the second (meth) acrylate system of a multilayered reinforcement, component D) in each of the systems obeying the definition independently of one another.

Component D) is an optional component.

The binder (A) to D)) can furthermore also comprise conventional additives D) such as are usually employed in reactive (meth)acrylate systems. These additives serve e.g. to increase the oxygen inhibition, and for this paraffins to the extent of 0.05 to 5 wt. % in the binder (A) to D)) and/or phosphites to the extent of 0.01 to 1 wt. % in A) to D) and also a polymer skin formation (paraffin-free) are particularly suitable. For the latter, in order to achieve a non-inhibited surface without paraffins, e.g. extremely high molecular weight polymers are used as additives, in particular in the case of the sole use of methyl methacrylate. Methyl methacrylate already evaporates at the surface during curing and leaves behind a non-tacky surface by polymer skin formation.

Defoamers, wetting agents, thixotropic agents, inhibitors, matting agents, bluing agents, UV stabilizers and polymerization chain regulators can furthermore be added.

Of these, thixotropic agents are particularly preferred. These serve to improve the storage stability and the sedimentation properties of particles in the resin components.

In a preferred embodiment, the backing-lined sanitary article of the invention is characterized in that at least one of the resin systems used for the backing lining comprises up to 0.5 part of thixotropic agent part per 1 part of particles E), based on the fillers E).

Conventional thixotropic agents are e.g. silica, e.g. Aerosil®200 and Aerosil®300.

The Fillers

The fillers of a (meth)acrylate system of the invention are composed of types E) and F). Type E) is optional, while fillers F) are essential at least for one of the reinforcements according to the invention.

Component E)

The following description applies both to a single-layered reinforcement and to the first and also the second (meth) acrylate system of a multilayered reinforcement, component E) in each of the systems obeying the definition independently of one another.

The single as well as the first and also the second (meth)acrylate system comprise component E) as optional constituents, that is to say one or more filler(s) which is/are inert under the conditions of depolymerization of the (meth) acrylates and has/have a fineness of $\leq 100 \mu m$, in an amount of up to 0–75 wt. %, based on the sum of A) to E). It goes without saying here that the first (meth)acrylate system can comprise different fillers to the second, that is to say that the nature and amount of the fillers are independent of one another in the framework stated.

In respect of the invention, fillers here which are inert under the conditions of depolymerization of the (meth) acrylates are to be understood as meaning those substances which do not substantially adversely influence or even render impossible depolymerization of acrylate polymers.

Acrylate polymers, above all PMMA, are among the few plastics which are outstandingly suitable for direct chemical recycling. This is to be understood as meaning that these polymers can be broken down again completely into the corresponding monomer units (depolymerization) at certain temperatures and pressures if heat is supplied in a suitable manner. Thus, for example, various continuous and discontinuous procedures are described in the literature and in patent specifications for depolymerization of polymethyl methacrylate (PMMA) and recovery of the monomeric methyl methacrylate (MMA) obtained as a result by heat treatment of acrylic glass waste at temperatures >200° C., condensation of the monomer vapours formed and working up of the crude monomers. In the process which is used most frequently in industry, the polymer material is introduced into a tank, which is partly filled with lead and is heated externally. The polymer material depolymerizes at temperatures above 400° C. and the monomer vapours formed pass via a pipeline to a condenser where they are condensed to a crude, liquid monomer. Corresponding depolymerization processes are known, for example, from DE-OS 21 32 716.

Fillers E) such as are now employed in the context of the invention should not be substances or, in the course of the depolymerization, result in decomposition products which render impossible or make unnecessarily difficult working up of the crude liquid monomer which is to be recycled in the depolymerization. Those fillers which collect as slag on the surface of the metal and, for example, can be removed with a rake, slide bar or the like during operation of the reactor are therefore preferred. A backing-lined sanitary article which is completely recyclable therefore exists by using fillers E) according to the invention.

Mineral fillers are usually used as the fillers. The fillers which can advantageously be employed in a single or in the first and/or second (meth)acrylate system include, in the context of the invention, mica, aluminium hydroxide, calcitic fillers, such as, for example, chalk and marble, quartzitic fillers, such as wollastonite, cristobalite and the like, amorphous silicates, flue ash, silicon carbide and/or barite.

Of these, mica, aluminium trihydrate (aluminium hydroxide) and quartzitic and calcitic fillers are particularly suitable for the invention. The use of mica both in the first and second (meth)acrylate system or also in the (meth) acrylate system of a single-layered reinforcement is extremely advantageous.

Fillers E) are used either by themselves or in a combination of several. As already stated, the amount is between 0 and 75 wt. %, based on the sum of components A) to E) of the binder+fillers.

If the proportion of fillers E) is higher than 75 wt. %, this can adversely influence the mixing and processing properties of the backing-lining material, in particular a mixture with such a high proportion of filler can be sprayed or pumped only poorly. Furthermore, at higher filler contents it can no longer be ensured that sufficient binder is available to obtain a stable coating.

On the other hand, a relatively high proportion of fillers E) is preferred according to the invention. The highest possible amount is sought in particular for cost reasons. Fillers E) are preferably contained in an amount of 40–65 wt. %, particularly preferably in an amount of 50–60 wt. %, in each case based on the sum of components A)–E).

Smooth fillers are preferred for the invention. By this is to be understood particles which have the smoothest possible surfaces. The particle size of the fillers according to the invention is ≦100 μm. They are consequently very fine fillers. The particle size of fillers E) is determined by sieve analysis and is necessary in the stated size in order to ensure processing of the fillers E)+binders A)–D) system. In processing by spraying in particular, the size of the filler particles is limited by the nozzle system used. However, the size of the filler particles E) is to be adapted to the requirements of the processing system by the person skilled in the art.

Furthermore, small-filler particles with a smooth surface are coated better by binders, tend less towards aggregation, and do not form air cushions in the reinforcing layer.

In a particular modification, a backing-lined sanitary article of the invention is therefore characterized in that the fillers E) of the first (meth)acrylate system, which cures to give a first layer on the reverse, have a fineness of ≦30 mm. Very fine fillers of this type allow a particularly clean and easy curing of the first layer and problem-free application of the second layer.

Component F)

First Variant: Single-layered Reinforcement

The following description initially relates to the case of a single-layered reinforcement.

Filler component F) is essential to the invention for a single-layered reinforcement. The microparticles F) are an essential component of a single-layered reinforcement.

A whole range of microparticles can be employed for the reinforcing layer according to the invention. In principle, these are hollow particles, which can be regular or irregular, but which are preferably ball-shaped or spherical and contain an inert gas in their hollow cavity.

The hollow microbeads which can be used as component F) in principle include hollow microbeads of various materials, such as e.g. glass, metals, metal oxides, polymers and organic compounds.

Hollow microbeads of plastic are preferably employed for the invention.

Hollow microbeads which are particularly preferably employed as component F) for the reinforcing layer in the present invention are those which are made of polymers, such as e.g. polystyrene, polyvinyl chloride, polyvinylidene chloride, polyvinyl acetate, polyacrylate, polyacrylonitrile, polybutadiene and polyethylene terephthalate; and furthermore hollow microbeads of copolymers or terpolymers which are based on those monomers which form the copolymers mentioned are also preferred.

Examples of such polymers and copolymers which are the hollow beads themselves are, inter alia, vinylidene chloride/acrylonitrile copolymer, polyvinylidene chloride, acrylonitrile/vinylidene chloride copolymer, acrylonitrile/methacrylonitrile copolymer, acrylonitrile/divinylbenzene/vinylidene chloride copolymer and the like.

Mixtures of hollow microbeads can also preferably be employed as component F) in the context of the invention.

The hollow microbeads or the microparticles which can be employed according to the invention can be coated with coatings to adapt the processing properties or to vary the reinforcing properties.

Modifications of the simple hollow microbeads are also particularly suitable. For example, those hollow microbeads which are made of polymers which are covered (coated) with mineral substances in order to ensure a better stability towards the influence of the ambient medium (acrylate resin) are of particular interest.

The coating of the hollow microbeads can comprise very fine-grained minerals, such as e.g. calcium carbonate, quartz, mica, aluminium hydroxide, cristobalite and the like.

Hollow microbeads, in particular those of plastic, coated with calcium carbonate are particularly preferred.

The hollow microbeads which have a particularly favourable action as component F) in the context of the invention can in principle be produced, as well as by other methods, in the following manner:

Coating of a core (sacrifice core) with the material in question, the core is then removed by various methods (e.g. dissolving in a solvent, evaporation or volatilization), so that only the shell remains. Hollow microbeads are produced above all from ceramic materials and metal oxides by this method.

Production in a nozzle reactor (nozzle reactor system):

In this case, the gas in the hollow microbeads and the liquefied material for the shell of the beads are sprayed via specially constructed nozzle systems (concentric openings). The liquefied material cools in a type of spray tower and solidifies to a hollow microbead filled with the particular gas (e.g. $H_2O$, $CO_2$, $SO_2$, air, $N_2$, etc.). Hollow microbeads are produced above all from polymeric materials by this method.

Phase separation of emulsions by liquid extraction: In this case, the spherical, liquid-filled particles (micelles) present in an emulsion are separated off from the surrounding liquid and then dried. Hollow microbeads are produced above all from metal oxides, but also from polymers, by this method.

A review of the production of hollow microbeads is to be found, for example, in Mat. Res. Soc. Symp. Proc. Vol. 372, 1995 Materials Research Society by David L. Wilcox, Sr. and Morris Berg, pages 3 to 13, and the literature cited therein.

Particularly suitable types of gas-filled hollow microbeads of plastic include, inter alia, ®Dualite types, e.g. ®Dualite M 6017AE, (Pierce & Stevens Corp.); ®Expancel types, e.g. ®Expancel 642 WU, ®Ropaque types, e.g. ®Ropaque OP 62 (Rohm & Haas Co.), Matsumoto Microspheres, e.g. Microsphere F-30E (Matsumoto Yushi Seiyaku Co. Ltd.) and the like.

The amount of fillers F) in the or a reinforcing layer according to the invention is in general critical. If the proportion of hollow microbeads F) is below 0.1 wt. %, based on the sum of all the constituents of the (meth)acrylate system, the effects according to the invention do not emerge in a sufficiently pronounced manner, in particular the physical properties are not improved sufficiently. Use of the microparticles, which are preferably made of plastic, in an amount of more than 50 wt. %, based on the sum of A)–F), is in general not advisable, since it does not seem possible to achieve an effect in respect of improving the physical properties of the reinforcing layer which bears a relationship to the additional cost outlay.

In a particular embodiment of the sanitary article according to the invention, this comprises filler F) in the (meth)acrylate system or in the first and/or second (meth)acrylate system in an amount in the range from 1 to 25 wt. %, based on the weight of the sum of constituents A)–F).

It is furthermore particularly advantageous if the sanitary article comprises filler F) in the (meth)acrylate system or in the first and/or second (meth)acrylate system in an amount in the range from 2 to 15 wt. %, based on the weight of the sum of constituents A)–F).

In another preferred embodiment, the sanitary article according to the invention is characterized in that filler F) is contained in the (meth)acrylate system or in the first and/or second (meth)acrylate system in an amount in the range from 3 to 10 wt. %, based on the weight of the sum of constituents A)–F).

Second Variant: Two- or Multilayered Reinforcement

In principle, that which has been stated for the single-layered variant applies in respect of the nature of filler F). It is important that two- or multilayered backing linings according to the invention comprise hollow microbeads F) in at least one layer. However, each individual layer can also accordingly comprise these hollow microbeads. The particles F) are preferably in the first backing-lining layer, i.e. that layer which is applied directly to the acrylic glass moulding as the first layer.

By simple experiments, the expert can choose the constituents, within the limits stated, according to nature and amount such that he obtains a single-layered backing lining which complies with DIN EN 198 or, in the case of a two-layered backing lining, a first backing-lining layer which gives the sanitary article the required impact strength, and such that he obtains a second backing-lining layer which imparts to the sanitary article the necessary rigidity.

The total reinforcement is usually 1.5 to 10 mm thick. Two layers together are as a rule likewise about 1.5 to 10 mm thick. It is advantageous here to form the first layer thinner and the second layer thicker than the first layer.

The second layer is advantageously about 2 to 3× as thick as the first. The total reinforcement in all cases is advantageously 1.5 to <8 mm thick.

Expediently, the first layer has a thickness in the range of 0.5–2.5 mm and the second layer has a thickness in the range of 3–<5.5 mm.

It was particularly astonishing here that with a single- or two-layered backing lining according to the invention, it was possible to produce sufficiently reinforced sanitary articles without glass fibre reinforcement.

The chopped glass fibres in the finished backing-lining layer according to the prior art usually form a tangle.

This felting effect has hitherto been regarded as unavoidable in order to obtain a reinforcement of adequate mechanical strength. The invention is to be evaluated as all the more surprising.

The present invention also provides a process for the production of a backing-lined sanitary article which is free from glass fibres and asbestos, in which a reactive resin system is sprayed onto the reverse of a moulding of acrylic glass, the resin system curing in contact with the acrylic glass moulding and during this procedure bonding to the acrylic glass moulding, the process being characterized in that a resin system which is based chiefly on (meth)acrylates, cures to a polymer having a glass transition temperature Tg>70° C. and comprises, based on 1 part by wt. of the resin system, up to 2.33 parts by wt. of those fillers which are inert under the conditions of depolymerization of the acrylic glass moulding is used, the resin system having the composition stated herein.

The process is preferably carried out in a manner in which two resin systems which differ from one another and are based chiefly on (meth)acrylates are used in succession, which systems each cure to a polymer having a glass transition temperature Tg>70° C. and can comprise, based on 1 part by wt. of the resin system, up to 2.33 parts by wt. of those fillers which are inert under the conditions of depolymerization of the acrylic glass moulding, a first resin system which imparts the required impact strength initially being sprayed onto the acrylic glass moulding and, after curing thereof, a second resin system which imparts the necessary rigidity being sprayed thereon. It is known from EP-A-0 693 503 to apply a resin system based on (meth)acrylates by the spray process. Analogously thereto, in a preferred variant according to the invention, two layers are applied in succession, attention additionally being paid in the choice of the possible fillers to their harmlessness in the depolymerization of the polymers, a one hundred per cent recyclable product, which at the same time can be produced in a manner which particularly saves material and is simple in the sequence of the spray process, being accessible by careful matching of the choice of material (both the moulding and the backing lining are based on (meth)acrylates and the fillers are inert) and the application process of the backing-lining layers.

Furthermore, and above all, glass fibres are avoided in all layers, whether in one or in both or several.

The process of the invention is preferably distinguished in that a polymerizable, cold-curing, reactive (meth)acrylate system which comprises

| A) | a) (meth)acrylate | 30–100 wt. % |
|---|---|---|
| | a1) methyl (meth)acrylate | 0–100 wt. % |
| | a2) $C_2$–$C_4$ (meth)acrylate | 0–100 wt. % |
| | a3) $\geq C_5$ (meth)acrylate | 10–50 wt. % |
| | a4) polyfunctional (meth)acrylates | 0–50 wt. % |
| | b) comonomers | 0–50 wt. % |
| | b1) vinylaromatics | 0–30 wt. % |
| | b2) vinyl esters | 0–30 wt. % |

B) per 1 part of A), 0.05–5 parts of a (pre)polymer which is soluble or swellable in A)

C) a redox system which is to be kept completely or partly separate from the polymerizable constituents of the system until the polymerization and comprises an accelerator and a peroxidic catalyst or initiator in an amount sufficient for cold-curing of component A)

D) customary additives

| E) fillers, based on the sum of A)–E) | 0–75 wt. %, |
|---|---| the fillers having a particle size of $\leq 100\ \mu m$

| F) hollow microparticles, preferably of plastic, filled 0.1–50 wt. %, with inert gas, based on the sum of A)–F) |
|---| is used as the first resin system.

It is furthermore preferable that a polymerizable, cold-curing, reactive (meth)acrylate system which comprises

| A) | a) (meth)acrylate | 30–100 wt. % |
|---|---|---|
| | a1) methyl (meth)acrylate | 0–100 wt. % |
| | a2) $C_2$–$C_4$ (meth)acrylate | 0–100 wt. % |
| | a3) $\geq C_5$ (meth)acrylate | 0–<10 wt. % |
| | a4) polyfunctional (meth)acrylates | 0–50 wt. % |
| | b) comonomers | 0–50 wt. % |
| | b1) vinylaromatics | 0–30 wt. % |
| | b2) vinyl esters | 0–30 wt. % |

B) per 1 part of A), 0.05–5 parts of a (pre)polymer which is soluble or swellable in A)

C) a redox system which is to be kept completely or partly separate from the polymerizable constituents of the sys tem until the polymerization and comprises an accelerator and a peroxidic catalyst or initiator in an amount sufficient for cold-curing of component A)

D) customary additives

| E) fillers, based on the sum of A)–E the fillers having a particle size <100 μm | 0–75 wt. %, |
|---|---|
| F) hollow microparticles, preferably of plastic, filled with inert gas, based on the sum of A)–F) | 0.1–50 wt. %, | the fillers having a particle size <100 μm

F) hollow microparticles, preferably of plastic, filled with inert gas, based on the sum of A)–F) 0.1–50 wt. %, is used as the second resin system.

To improve the sedimentation properties of fillers E) during relatively long storage times before use and therefore to increase the storage stability, it is preferable, before use of the reactive resin system, to incorporate fillers E) into the first and/or second system of binders A)–D) with a homogenizing unit with the addition of a thixotropic agent in an amount of 0.1–0.5 parts, based on 1 part of E).

By using a suitable homogenizing unit in the preparation of the resin system, the size and shape of the filler particles are furthermore influenced in a positive manner.

The backing-lined sanitary articles according to the invention can be produced successively by spraying or squirting a resin system A) to F) or the particular resin systems A) to F) onto the reverse of the acrylic glass moulding.

In this procedure, two streams of material are in each case preferably mixed with one another during the spraying, a first of the streams of material comprising the polymerizable constituents of the resin mixture and a second stream of material comprising the constituents of component C) of the resin system which are to be kept separate from the polymerizable constituents of the resin system until the polymerization.

High-pressure airless spray units (e.g. Aplicator [sic] IP 8000 from ESSKA, Hamburg), surface jet spray units from Glascraft or a two-component metering and mixing unit with an operating pressure of 40 to 60 bar (e.g. "Twin-Injection" from Reinhardt Technik Kierspe) are preferably used for the spraying-on. Using such units, especially in the fan jet process, coatings can be applied with a simultaneous significant reduction in the emission values. This can advantageously be achieved with spray guns which allow individual regulation of the loss-free laminate application.

Particularly suitable mixing and atomizing processes are provided by EP 38 481.

The process of the invention is particularly distinguished in that it can be carried out at ambient temperature, i.e. usually between 0 and 35° C., but also, if desired, at more extreme temperatures, such as −10 to +45° C.

The invention is explained in more detail below with the aid of embodiment examples, with reference to the attached figure.

COMPARISON EXAMPLE 1

(VB1)

Single-layered reinforcement without hollow microbeads, approx. 3 mm thick 40.00 parts by wt. of a binder comprising

| 18.00% | polymethyl methacrylate |
|---|---|
| 75.00% | methyl methacrylate |
| 5.00% | triethylene glycol dimethacrylate |
| 0.50% | paraffins (melting point <56° C.) |
| 0.50% | dimethylparatoluidine |
| 0.50% | diisopropoxyparatoluidine |
| 0.50% | additives, stabilizers | are stirred with

| 60.00 parts by wt. | mica (<100 μm) and |
|---|---|
| 0.10 part by wt. | thixotropic agent (Byk 410) | for 4 hours.

The mixture has a viscosity of 11,000–13,000 mPas.

This mixture is applied with a high-pressure airless spray unit of the type Applicator IP 8000 together with Cadox 40 E in a volume ratio of 100:2 to 100:5, under a spray pressure of 180 bar, on to the moulded acrylic glass component. The amount applied is 6–7 kg/m$^2$. Manual reworking is not necessary. A backing-lining layer about 3 mm thick is obtained.

At a hardener dosage of 100:2, the curing time is about 15–25 min.

At a hardener dosage of 100:4, the curing time is about 5–15 min.

COMPARISON EXAMPLE 2

(VB2)

Two-layered reinforcement with reinforcing layer 1a, but both layers without hollow microbeads, joint thickness of the two layers together about 6 mm;

(i) Reinforcing Layer 1a 40.00 parts by wt. of a binder comprising

| 30.00% | polymethyl methacrylate |
|---|---|
| 42.00% | methyl methacrylate |
| 25.70% | 2-ethylhexyl acrylate |
| 0.50% | triethylene glycol dimethacrylate |
| 0.80% | diisopropylolparatoluidine [sic] |
| 0.70% | dimethylparatoluidine |
| 0.30% | paraffin (melting point <56° C.) | are stirred with

| 60.00 parts by wt. | calcium carbonate (<100 μm) and |
|---|---|
| 0.10 part by wt. | thixotropic agent (Byk 410) | for 4 hours.

The mixture has a viscosity of 6,000–10,000 mPas.

This mixture is applied with a high-pressure airless spray unit of the type Applicator IP 8000 together with Cadox 40 E in a volume ratio of 100:2 to 100:5, under a spray pressure of 180 bar, on to the moulded acrylic glass component. Manual reworking is not necessary. The amount applied is 2–4 kg/m$^2$.

At a hardener dosage of 100:2, the curing time is 15–40 min.

At a hardener dosage of 100:5, the curing time is 5–20 min.

A second spray application is then carried out with the following mixture:

(ii) Reinforcing Layer 1

40.00 parts by wt. of a binder comprising

| | |
|---|---|
| 18.00% | polymethyl methacrylate |
| 75.00% | methyl methacrylate |
| 5.00% | triethylene glycol dimethacrylate |
| 0.50% | paraffins (melting point <56° C.) |
| 0.50% | dimethylparatoluidine |
| 0.50% | diisopropylolparatoluidine [sic] |
| 0.50% | additives, stabilizers | are stirred with

| | |
|---|---|
| 60.00 parts by wt. | mica (<100 μm) |
| 0.10 part by wt. | thixotropic agent (Byk 410) | for 4 hours.

The mixture has a viscosity of 11,000–13,000 mPas.

The hardener dosage is 100:2 to 100:5.

The spray pressure is. 180 bar.

The amount applied is 6–10 kg/m².

The curing time is 15–30 min at a hardener dosage of 100:2.

At a hardener dosage of 100:5, the curing time is about 5–15 min.

EXAMPLE 3

(B3)

Single-layered reinforcement with hollow microbeads, thickness of the backing-lining layer approx. 3 mm;

40.00 parts by wt. of a binder comprising

| | |
|---|---|
| 18.00% | polymethyl methacrylate |
| 75.00% | methyl methacrylate |
| 5.00% | triethylene glycol dimethacrylate |
| 0.50% | paraffins (melting point <56° C.) |
| 0.50% | dimethylparatoluidine |
| 0.50% | diisopropoxyparatoluidine |
| 0.50% | additives, stabilizers | are stirred with

| | |
|---|---|
| 54.00 parts by wt. | mica (<100 μm) |
| 6.00 parts by wt. | gas-filled hollow microbeads of acrylonitrile copolymer, coated with calcium carbonate and having an average particle size of about 95 μm, of the type ® Dualite 6032 from Pierce & Stevens Corporation and |
| 0.10 part by wt. | thixotropic agent (Byk 410) | for 4 hours.

The mixture has a viscosity of 11,000–13,000 mPas.

This mixture is applied with a high-pressure airless spray unit of the type Applicator IP 8000 together with Cadox 40 E in a volume ratio of 100:2 to 100:5, under a spray pressure of 180 bar, to the moulded acrylic glass component. The amount applied is about 4–7 kg/M². Manual reworking is not necessary. A backing-lining layer about 3 mm thick is obtained.

At a hardener dosage of 100:2, the curing time is about 15–25 min.

At a hardener dosage of 100:4, the curing time is about 5–15 min.

EXAMPLE 4

(B4)

Two-layered reinforcement with reinforcing layer 1a, first reinforcing layer 1a with hollow microbeads, second reinforcing layer without hollow microbeads, thickness of each reinforcing layer about 1.5 mm, thickness of the total reinforcement about 3 mm;

(i) Reinforcing Layer 1a 40.00 parts by wt. of a binder comprising

| | |
|---|---|
| 30.00% | polymethyl methacrylate |
| 42.00% | methyl methacrylate |
| 25.70% | 2-ethylhexyl acrylate |
| 0.50% | triethylene glycol dimethacrylate |
| 0.80% | diisopropylolparatoluidine [sic] |
| 0.70% | dimethylparatoluidine |
| 0.30% | paraffins (melting point <56° C.) | are stirred with

| | |
|---|---|
| 54.00 parts by wt. | mica (<100 μm) |
| 6.00 parts by wt. | gas-filled hollow microbeads of acrylonitrile copolymer, coated with calcium carbonate and having an average particle size of about 95 μm, of the type ® Dualite 6032 from Pierce & Stevens Corporation and |
| 0.10 part by wt. | thixotropic agent (Byk 410) | or 4 hours.

The mixture has a viscosity of 6,000–10,000 mpas.

This mixture is applied with a high-pressure airless spray unit of the type Applicator IP 8000 together with Cadox 40 E in a volume ratio of 100:2 to 100:5, under a spray pressure of 180 bar, to the moulded acrylic glass component. Manual reworking is not necessary. The amount applied is about 2–3.5 kg/m².

At a hardener dosage of 100:2, the curing time is 15–40 min.

At a hardener dosage of 100:5, the curing time is 5–20 min.

A second spray application is then carried out with the following mixture:

(ii) Reinforcing Layer 1

40.00 parts by wt. of a binder comprising

| | |
|---|---|
| 18.00% | polymethyl methacrylate |
| 75.00% | methyl methacrylate |
| 5.00% | triethylene glycol dimethacrylate |
| 0.50% | paraffins (melting point <56° C.) |
| 0.50% | dimethylparatoluidine |
| 0.50% | diisopropylolparatoluidine [sic] |
| 0.50% | additives, stabilizers | are stirred with

| | |
|---|---|
| 60.00 parts by wt. | mica (<100 µm) |
| 0.10 part by wt. | thixotropic agent (Byk 410) | for 4 hours.

The mixture has a viscosity of 11,000–13,000 mPas.
The hardener dosage is 100:2 to 100:5.
The spray pressure is 180 bar.
The amount applied is 2–3.5 kg/m².
The curing time is 15–30 min at a hardener dosage of 100:2.
At a hardener dosage of 100:5, the curing time is about 5–15 min.

After the curing, the complete tubs are subjected to tests according to DIN EN 198, and the testing bodies which are cut out of the finished tubs, are subjected to tests according to DIN ISO 4624 DIN ISO 178 and DIN ISO 179. The specifications from the provisions applicable in each case in 1996 were used.

In the testing by the hot water alternating test according to DIN EN 198, a tub is filled alternately with water of 75° C. and then of 12° C. DIN EN 198 requires 100 such cycles to be survived without damage. Survival means that the state of the tube shows no detachment of the reinforcement and no cracks in the acrylic glass.

The behaviour under impact stress in accordance with the falling ball test according to DIN EN 198 is acceptable if no damage to the surface and the underneath of a tub occurs after a steel ball of 200 g falls on to the base of the tub from a height of 1 m.

These and the other results can be seen from table 1.

TABLE 1

| Example/ comparison example | Impact strength DIN ISO 179 kJ/m² | Adhesive strength DIN ISO 4624 N/mm² | Flexural strength DIN ISO 178 MPa | Hot water alternating test DIN EN 198 Number of cycles | Falling ball test DIN EN 198 Damage |
|---|---|---|---|---|---|
| VB1 | 8 | 0.3 | 15 | 150 (defective) | none |
| VB2 | 10 | — | — | 200 (defective) | none |
| B3 | 25 | 0.5 | 25 | 350 (intact) | none |
| B4 | 15 | 0.5 | 20 | 210 (defective) | none |

What is claimed is:

1. A backing-lined sanitary article comprising an acrylic glass molding having a finished side and an opposite reverse side, which is reinforced on its reverse side with 1.5 to 10 mm thick polymer material that is free from glass fibers and asbestos and is bonded to the acrylic glass molding without additional adhesion promoters, wherein the reinforcing material comprises a first and a second layer, the first layer obtained by curing a polymerizable, cold-curing, reactive first (meth)acrylate system that is sprayed onto the reverse side of the acrylic glass molding and which comprises A)
  a) a (meth)acrylate component, in an amount of 50–100 wt. %, which consists of
    a1) methyl (meth)acrylate, in an amount of 0–100 wt. %,
    a2) $C_2$–$C_4$ (meth)acrylate, in an amount of 0–100 wt. %;
    a3) $\geq C_5$ (meth)acrylate, in an amount of 10–50 wt. %, and
    a4) polyfunctional (meth)acrylates selected from the group consisting of di-, tri-, and tetra-functional (meth)acrylates, in an amount of 0–50 wt. %
  b) a comonomer component, in an amount of 0–50 wt. %, which consists of
    b1) vinylaromatics, in an amount of 0–30 wt. %, and
    b2) vinyl esters, in an amount of 0–30 wt. %,
wherein all weight percents are based on the total weight of the monomer component A), B) a (pre)polymer, which is soluble or swellable in the monomer component A), in an amount of 0.05–5 parts by weight per 1 part by weight of A), C) a redox system, which is to be kept separate from the constituents of the system to be polymerized until the polymerization, and which comprises an accelerator, and a periodic catalyst or initiator, in an amount sufficient for cold-curing of component A), D) customary additives, E) fine fillers, which are inert under the conditions of depolymerization of acrylic polymers, including heat treatment at a temperature greater than 200° F., and which have a particle diameter of $\leq 100$ µm, in an amount of 0–75 wt. %, based on the sum of A)–E), and F) hollow microparticles filled with inert gas, in an amount of 0.1–50 wt. %, based on the sum of A)–F), the second layer obtained by curing a polymerizable, cold-curing, reactive second (meth)acrylate system that is sprayed onto the first layer and which comprises A)
  a) a (meth)acrylate component, in an amount of 50–100 wt. %, which consists of
    a1) methyl (meth)acrylate, in an amount of 0–100 wt. %,
    a2) $C_2$–$C_4$ (meth)acrylate, in an amount of 0–100 wt. %,
    a3) $\geq C_5$ (meth)acrylate, in an amount of 0–<10 wt. %, and
    a4) polyfunctional (meth)acrylates selected from the group consisting of di-, tri-, and tetra functional (meth)acrylates, in an amount of 0–50 wt. %,
  b) a comonomer component, in an amount of 0–50 wt. %, which consists of
    b1) vinylaromatics, in an amount of 0–30 wt. %, and
    b2) vinyl esters, in an amount of 0–30 wt. %,
wherein all weight percents are based on the total weight of the monomer component A), B) a (pre)polymer, which is soluble or swellable in the monomer component A), in an amount of 0.05–5 parts by weight per 1 part by weight of A), C) a redox system, which is to be kept separate from the constituents of the system to be polymerized until the polymerization, and which comprises an accelerator, and a periodic catalyst or initiator, in an amount sufficient for cold-curing of component A), D) customary additives, E) fine fillers, which are inert under the conditions of depolymerization of acrylic polymers, including heat treatment at a temperature greater than 200° F., and which have a particle diameter of $\geq 100$ µm, in an amount of 0–75 wt. %, based on the sum of A)–E), and F) hollow microparticles filled with inert gas, in an amount of 0–50 wt. %, based in the sum of A)–F).

2. The sanitary article according to claim 1, wherein filler F) in the first and second (meth)acrylate systems comprises gas-filled, expanded hollow microbeads of plastic.

3. The sanitary article according to claim 2, wherein the hollow microbeads are coated with calcium carbonate.

4. The sanitary article according to claim 1, wherein filler E) in the first and second (meth)acrylate systems is mica.

5. The sanitary article according to claim 1, wherein the first and second (meth)acrylate systems have a weight ratio of components B) A) in the range of 0.1:1 to 2:1.

6. The sanitary article according to claim 5, wherein the weight ratio of components B):A) is in the range of 0.2:1 to 1:1.

7. The sanitary article according to claim 1, wherein the first layer has a thickness of 0.5–2.5 mm, and the second layer has a thickness in the range of 2.5–<5.5 mm.

8. A process for the production of the backing-lined sanitary article of claim 1, which comprises the steps of:

spraying the polymerizable, cold-curing, reactive first (meth)acrylate system onto the reverse side of the acrylic glass molding, curing the first (meth)acrylate system and allowing it to bond to the acrylic glass molding to form the first layer, which imparts impact strength, spraying the polymerizable, cold-curing, reactive second (meth)acrylate system onto the first layer, curing the second (meth)acrylate system and allowing it to bond to the first layer to form the second layer, which imparts rigidity, wherein the first and second (meth)acrylate systems each comprise fillers E) and microparticles F) in an amount of up to 2.33 parts by weight based on 1 part by weight of the particular resin system, and wherein the first and second (meth)acrylate systems each cure to form a polymer having a glass transition temperature Tg>70° C.

9. The process according to claim 8, wherein before use of the reactive resin systems, the filler E) is incorporated into the first and second (meth)acrylate systems with a homogenizing unit with the addition of a thixotropic agent in an amount of 0.01–0.5 parts by weight based on 1 part by weight of E).

10. The process according to claim 8, wherein the filler E) comprises calcium carbonates, chalk, marble, barite, quartzites, wollastonite, cristobalite, amorphous silicates, flue ash, mica, or combinations thereof.

11. The process according to claim 10, wherein the filler E) comprises mica.

12. The process according to claim 8, wherein the resins systems are sprayed successively onto the reverse side of the acrylic glass molding, during spraying, in each case, two streams of material are mixed with one another, the first stream of material comprising the polymerizable constituents of the resin mixture and the second stream of material comprising the constituents of component C) of the resin system, which are to be kept separate from the polymerizable constituents of the resin system until the polymerization.

13. The sanitary article according to claim 1, wherein the pre-polymer material of at least one of the first and second reinforcing layers is a material selected from the group consisting of PMMA paint beads obtained by suspension polymerization having an average particle diameter of up to 0.8 mm, emulsion polymers, and grinding granules obtained from recycling processes.

* * * * *